United States Patent
Matsuura

(10) Patent No.: US 11,512,941 B2
(45) Date of Patent: Nov. 29, 2022

(54) ANALYSIS APPARATUS, ANALYSIS METHOD, AND INTERFERENCE MEASUREMENT SYSTEM

(71) Applicant: Mitutoyo Corporation, Kanagawa (JP)

(72) Inventor: Shimpei Matsuura, Eindhoven (NL)

(73) Assignee: MITUTOYO CORPORATION, Kawasaki (JP)

(*) Notice: Subject to any disclaimer, the term of this patent is extended or adjusted under 35 U.S.C. 154(b) by 146 days.

(21) Appl. No.: 17/032,747

(22) Filed: Sep. 25, 2020

(65) Prior Publication Data
US 2021/0102800 A1   Apr. 8, 2021

(30) Foreign Application Priority Data
Oct. 8, 2019  (JP) .............................. JP2019-185330

(51) Int. Cl.
*G01B 11/14* (2006.01)
*G01B 11/30* (2006.01)
*G01B 9/02* (2022.01)

(52) U.S. Cl.
CPC .......... *G01B 11/14* (2013.01); *G01B 9/02083* (2013.01); *G01B 11/30* (2013.01)

(58) Field of Classification Search
CPC ....... G01B 11/14; G01B 11/30; G01B 11/306; G01B 11/2441; G01B 9/02083; G01B 9/02087; G01B 9/02072; G01B 9/02004; G01B 9/02027; G01B 9/0203; G01B 2210/56; G06T 7/521
See application file for complete search history.

(56) References Cited

U.S. PATENT DOCUMENTS

| | | | | |
|---|---|---|---|---|
| 2006/0158657 A1* | 7/2006 | Lega | ...................... | G01B 11/02 356/497 |
| 2006/0250618 A1* | 11/2006 | Kaasaki | ................. | G01B 11/02 356/512 |
| 2009/0225327 A1* | 9/2009 | Maeda | ................... | G01B 11/00 356/496 |

FOREIGN PATENT DOCUMENTS

CN   109029739 A   * 12/2018   ................ G01J 9/02

OTHER PUBLICATIONS

D. Malacara, "Optical Shop Testing 3rd ed.", Wiley-Interscience, 2007, English text, 46 pages.
(Continued)

*Primary Examiner* — Son T Le
*Assistant Examiner* — Lal C Mang
(74) *Attorney, Agent, or Firm* — Rankin, Hill & Clark LLP

(57) ABSTRACT

An analysis apparatus includes an acquisition part that acquires a plurality of interference images based on lights having a plurality of different wavelengths from an interference measurement apparatus, a removing part that outputs an interference component by removing a non-interference component included in an interference signal for each pixel in the plurality of the interference images, a conversion part that generates an analysis signal by performing a Hilbert transformation on the interference component, and a calculation part that calculates a distance between a reference surface and a surface of an object to be measured by specifying a phase gradient of a wavelength of light radiated onto the reference surface and the surface of the object to be measured on the basis of the interference component and the analysis signal.

7 Claims, 5 Drawing Sheets

(56) References Cited

OTHER PUBLICATIONS

G. Moschetti, et. al., "Phase and fringe order determination in wavelength scanning interferometry", Opt. Express, 24, #258089, 2016, English text, 16 pages.

* cited by examiner

ANALYSIS APPARATUS, ANALYSIS METHOD, AND INTERFERENCE MEASUREMENT SYSTEM

CROSS-REFERENCE TO RELATED APPLICATIONS

The present application claims priority to Japanese Patent Applications number 2019-185330, filed on Oct. 8, 2019. The contents of this application are incorporated herein by reference in their entirety.

BACKGROUND OF THE INVENTION

Inspection of surface geometry of a semiconductor wafer, a high-precision mirror, and the like may require high precision, and a Fizeau laser interferometer, a Twyman-Green interferometer, or the like is used for such inspection. An interferometer using a common monochromatic laser can measure the geometry of unevenness on a surface of an object to be measured with an accuracy on the order of nanometers, but cannot measure the geometry including unevenness of a ¼ wavelength or more because it is unable to specify a phase order. In order to measure such a geometry including unevenness of a ¼ wavelength or more, a wavelength scanning interferometer for scanning the wavelength of light outputted from a light source has been known (for example, see Non-Patent Document 1: D. Malacara, "Optical Shop Testing 3rd ed.", Wiley-Interscience, 2007 and Non-Patent Document 2: G. Moschetti, et. al., "Phase and fringe order determination in wavelength scanning interferometry", Opt. Express, 24, #258089, 2016).

It is known that, in the wavelength scanning interferometer, height resolution can be improved by, for example, enlarging the wavelength range of the light source for scanning. However, when the wavelength range of the light source is expanded, the light intensity level of the interference light may fluctuate due to the wavelength dependency of the light intensity level of the light source, the wavelength dependency of the reflectance of the object to be measured reflecting light, or the like, and as a result, the object to be measured sometimes cannot be measured with high accuracy.

BRIEF SUMMARY OF THE INVENTION

The present invention focuses on these points, and an object of the present invention is to enable measurement of the unevenness of the object to be measured with high accuracy even if the wavelength range of the light source is enlarged, in the wavelength scanning interferometer, to the extent that the light intensity level of the interference light fluctuates.

The first aspect of the present invention provides an analysis apparatus for analyzing an interference image generated by a wavelength-scanning-type interference measurement apparatus that generates the interference image of reference light and measurement light reflected by irradiating a reference surface and a surface of an object to be measured with lights having a plurality of different wavelengths, the analysis apparatus includes an acquisition part that acquires a plurality of the interference images based on the lights having the plurality of different wavelengths from the interference measurement apparatus, a removing part that outputs an interference component by removing a non-interference component included in an interference signal for each pixel in the plurality of the interference images, a conversion part that generates an analysis signal by performing a Hilbert transformation on the interference component, and a calculation part that calculates a distance between the reference surface and the surface of the object to be measured by specifying a phase gradient of a wavelength of the light radiated onto the reference surface and the surface of the object to be measured on the basis of the interference component and the analysis signal.

The second aspect of the present invention provides an analysis method for analyzing an interference image generated by a wavelength-scanning-type interference measurement apparatus that generates the interference image of reference light and measurement light reflected by irradiating a reference surface and a surface of an object to be measured with lights having a plurality of different wavelengths, the analysis method includes the steps of acquiring a plurality of the interference images based on the lights having the plurality of different wavelengths from the interference measurement apparatus, outputting an interference component by removing a non-interference component included in an interference signal for each pixel in the plurality of the interference images, generating an analysis signal by performing a Hilbert transformation on the interference component, and calculating a distance between the reference surface and the surface of the object to be measured on the basis of the interference component and the analysis signal.

The third aspect of the present invention provides an interference measurement system including a wavelength-scanning-type interference measurement apparatus, and the analysis apparatus according to the first aspect that analyzes a plurality of the interference images captured by the interference measurement apparatus, wherein the interference measurement apparatus includes a light source part that irradiates the surface of the object to be measured with light having a plurality of different wavelengths, the reference surface that is provided on an optical axis of the light having the plurality of different wavelengths, and an image capturing part that captures the interference image of reference light reflected at the reference surface and measurement light reflected at the surface of the object to be measured.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Configuration Example of an Interference Measurement System 1000>

Figure 1:
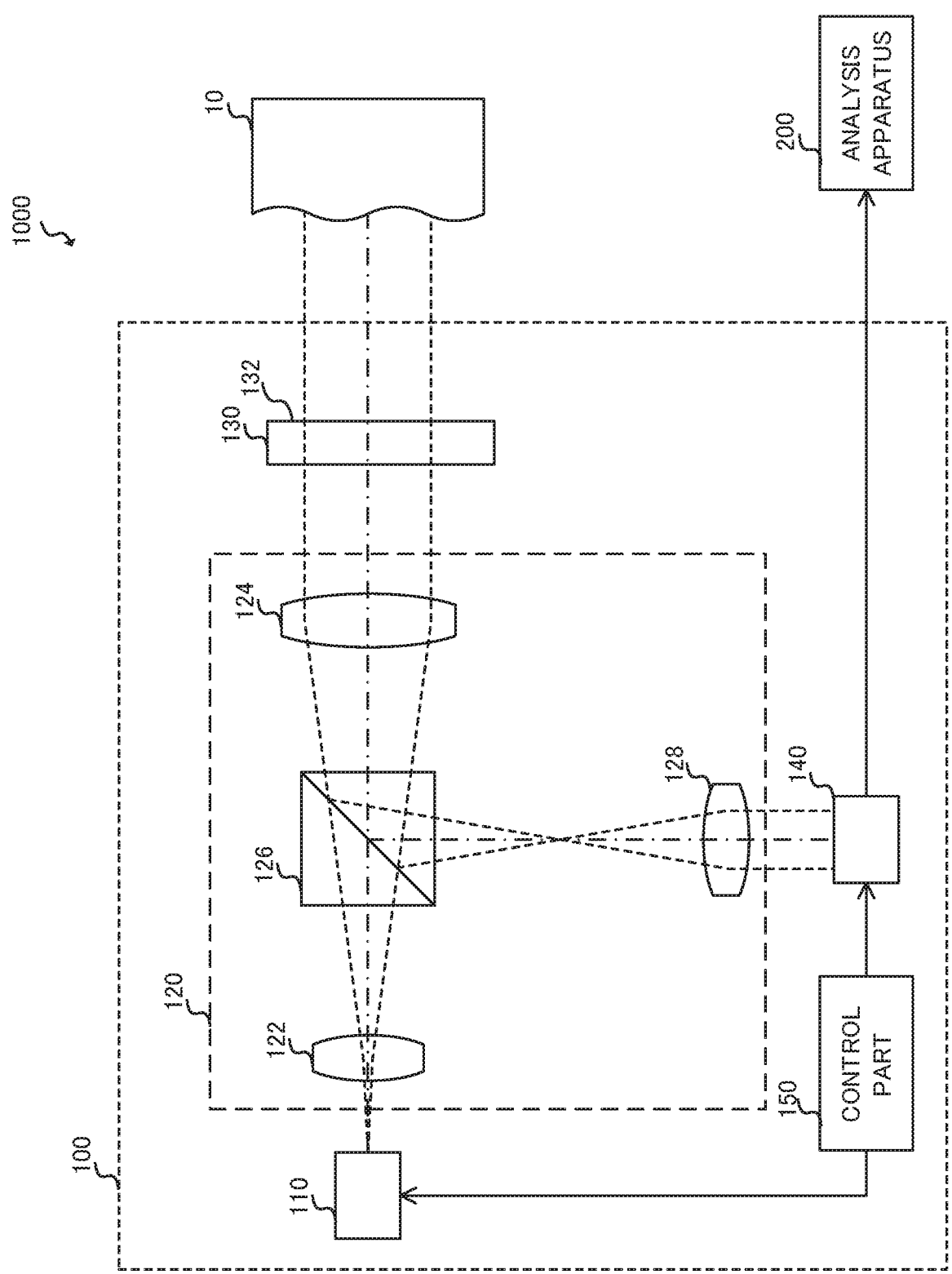
FIG. 1 shows a configuration example of an interference measurement system 1000 according to the present embodiment together with an object to be measured 10.

FIG. 1 shows a configuration example of an interference measurement system 1000 according to the present embodiment together with an object to be measured 10. The interference measurement system 1000 constitutes a Fizeau interferometer and measures surface geometry of the object to be measured 10. The object to be measured 10 is, for example, a solid state object such as a semiconductor wafer including Si, GaAs, GaN, or the like, a high-precision mirror, and a metal. The interference measurement system 1000 is provided with an interference measurement apparatus 100 and an analysis apparatus 200. The interference measurement apparatus 100 includes a light source part 110, an optical system 120, a reference object 130, an image capturing part 140, and a control part 150.

The light source part 110 is a tunable wavelength light source that can change the wavelength of the light to be outputted in accordance with an inputted control signal. The light source part 110 irradiates the surface of the object to be measured 10 with light. The light source part 110 includes, for example, a tunable-type laser. Further, the light source part 110 may include a combination of a broadband light source for outputting light having a predetermined wavelength range and a variable band-pass filter for changing the wavelength to be passed in accordance with the inputted control signal.

The optical system 120 irradiates the object to be measured 10 and the reference object 130 with the light outputted from the light source part 110. Further, the optical system 120 forms an image of reflected light from the object to be measured 10 and the reference object 130 on the image capturing part 140. The optical system 120 includes a magnifying lens 122, a collimating lens 124, a beam splitter 126, and an image forming lens 128.

The magnifying lens 122 enlarges a diameter of the laser light outputted from the light source part 110. The collimating lens 124 collimates the light entering from the magnifying lens 122 and irradiates the surface of the object to be measured 10 with the collimated light. Further, the light reflected by the surface of the object to be measured 10 enters the collimating lens 124, and the collimating lens 124 emits the reflected light to the beam splitter 126 while reducing the diameter thereof. Here, the light reflected by the surface of the object to be measured 10 is referred to as measurement light.

The reference object 130 is provided between the collimating lens 124 and the object to be measured 10, and a portion of the collimated light emitted from the collimating lens 124 is reflected by a reference surface 132 of the reference object 130. Thus, the collimating lens 124 emits the measurement light and the light reflected by the reference surface 132 to the beam splitter 126. Here, the light reflected by the reference surface 132 is referred to as reference light.

The beam splitter 126 reflects portions of the measurement light and the reference light emitted from the collimating lens 124 toward the image capturing part 140. The beam splitter 126 includes, for example, a half mirror. The image forming lens 128 forms an image of the light reflected by the beam splitter 126 on the image capturing part 140. That is, the image forming lens 128 forms an interference image, in which the measurement light and the reference light interfere with each other, on the image capturing part 140.

The reference object 130 includes the reference surface 132, as described above. The reference object 130 is, for example, a half mirror having the reference surface 132 as a mirror surface. The reference surface 132 is provided substantially perpendicular to an optical axis of the laser light outputted from the light source part 110. Further, the reference surface 132 is movably provided on the optical axis of the laser light.

The image capturing part 140 captures the interference image of the reference light reflected by the reference surface 132 and the measurement light reflected by the surface of the object to be measured 10. The image capturing part 140 includes, for example, a camera or the like, and captures the interference image formed by the optical system 120 in response to the control signal.

The control part 150 controls the light source part 110 and the image capturing part 140 to capture a plurality of interference images of the reference light and the measurement light at a plurality of wavelengths. The control part 150 transmits, to the light source part 110, a control signal for designating the wavelength of the light to be outputted, for example. Further, the control part 150 transmits the control signal including an instruction of capturing the interference image to the image capturing part 140. As an example, the control part 150 controls the light source part 110 and the image capturing part 140 to change the wavelength of the light outputted by the light source part 110 with a wavelength interval corresponding to a predetermined phase shift amount and capture the interference image each time the wavelength of the light changes. The control part 150 includes, for example, a Central Processing Unit (CPU) and the like.

In this manner, the interference measurement apparatus 100 irradiates the reference surfaces 132 and the surface of the object to be measured 10 with the laser light to generate the interference image of the reflected reference light and measurement light. The interference measurement apparatus 100 having the optical system 120 shown in FIG. 1 is known as the Fizeau interferometer, and in principle, can measure geometry of unevenness on the surface of the object to be measured 10 with accuracy on the order of nanometers.

Such an interference measurement apparatus 100 performs frequency measurement of the light intensity modulation with wavelength scanning and analyzes the interference image using, for example, a Fourier transform. In this case, height resolution dh of the geometry measurement corresponds to the frequency resolution of the Fourier transform, and is known to be determined as in the following equation.

$$dh = \frac{\lambda_{max}\lambda_{min}}{\lambda_{max} - \lambda_{min}} \qquad \text{[Equation 1]}$$

Here, $\lambda_{max}$ is the longest wavelength of the light outputted by the light source part 110, and $\lambda_{min}$ is the shortest wavelength of the light outputted by the light source part 110. It can be seen from [Equation 1] that if the light source part 110 enlarges a range of a wavelength for scanning, the resolution dh of the geometry measurement of the interference measurement apparatus 100 becomes smaller and higher resolution measurement can be performed. However, if the light source part 110 enlarges the range of the wavelength for scanning, the wavelength dependency of the intensity level of the light outputted by the light source part 110 becomes remarkable, and the fluctuation of the light intensity level in the scanning range of the wavelength sometimes increases.

Further, the wavelength dependency of the reflectance of the object to be measurement reflecting light also becomes remarkable, and the fluctuation of the light intensity level in the reflected light with respect to the scanning of the wavelength of the light outputted by the light source part 110 sometimes increases. Thus, when the fluctuation of the light intensity level in the interference light is increased due to the light source part 110 enlarging the scanning range of the wavelength, an error occurs in the frequency measurement of the light intensity modulation, and the object to be measured 10 might not be measured accurately.

Therefore, the analysis apparatus 200 according to the present embodiment applies a Hilbert transformation to an analysis signal for each pixel in the interference image generated by the interference measurement apparatus 100 to reduce such an error, to easily perform the interference measurement with high resolution and high accuracy. The analysis apparatus 200 will be described below.

<Configuration Example of the Analysis Apparatus 200>

Figure 2:
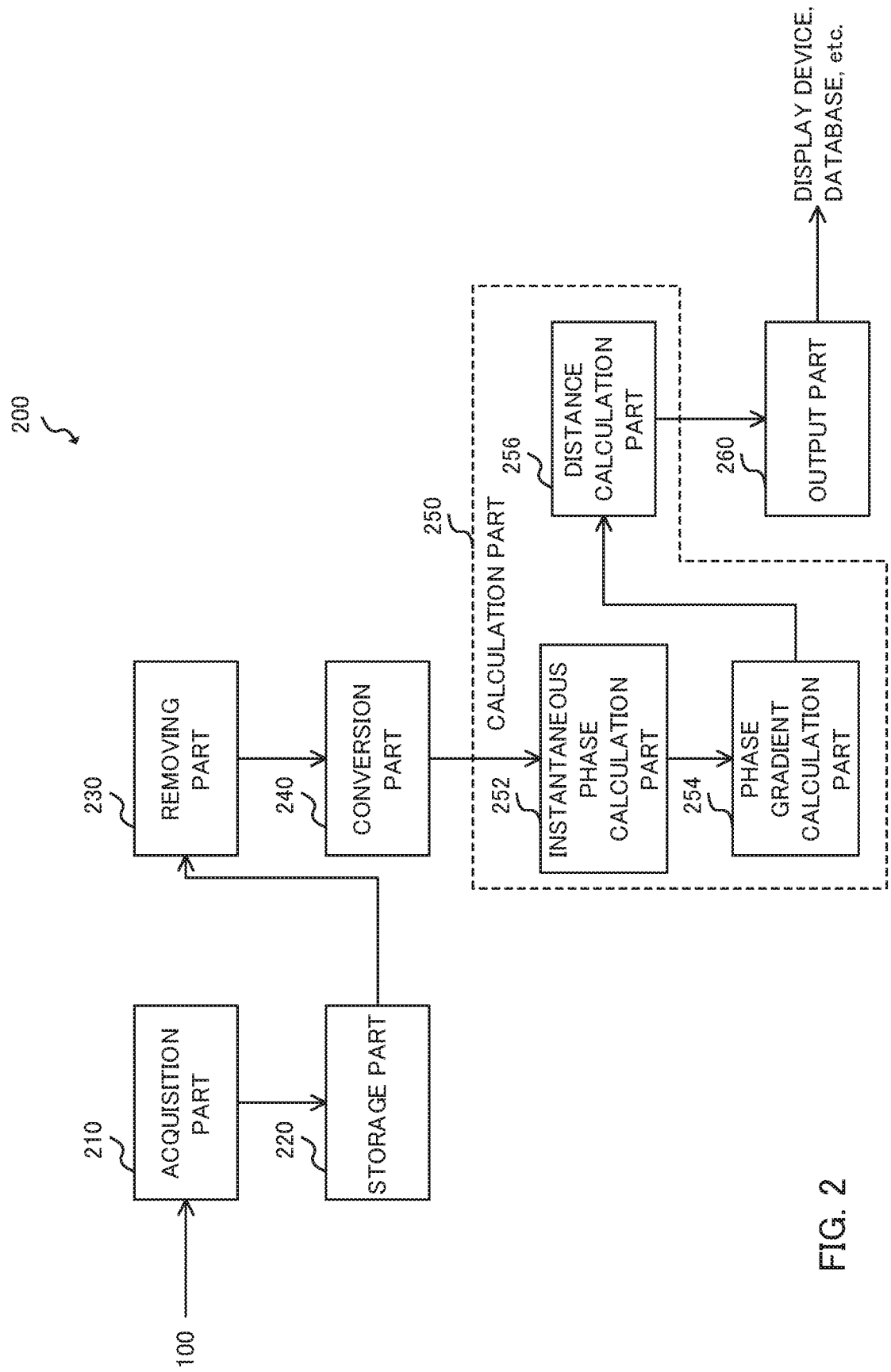
FIG. 2 shows a configuration example of an analysis apparatus 200 according to the present embodiment.

FIG. 2 shows a configuration example of the analysis apparatus 200 according to the present embodiment. As an example, the analysis apparatus 200 is a computer such as a server. The analysis apparatus 200 analyzes the interference image generated by a wavelength-scanning-type interference measurement apparatus 100 that irradiates the reference surfaces 132 and the surfaces of the object to be measured 10 with lights having a plurality of different wavelengths to generate the plurality of interference images of the reflected reference light and measurement light. The analysis apparatus 200 may execute at least a portion of the operation of the control part 150 of the interference measurement apparatus 100. The analysis apparatus 200 includes an acquisition part 210, a storage part 220, a removing part 230, a conversion part 240, a calculation part 250, and an output part 260.

The acquisition part 210 acquires the plurality of interference images based on the light having the plurality of different wavelengths from the interference measurement apparatus 100. The acquisition part 210 may be connected to the image capturing part 140 of the interference measurement apparatus 100 to acquire the interference image and, alternatively, may acquire the interference image via a network or the like. The acquisition part 210 may acquire the plurality of interference images from an external database or the like. In this instance, the acquisition part 210 acquires, for example, the interference image previously generated by the interference measurement apparatus 100.

The storage part 220 stores image data of the interference image acquired by the acquisition part 210. The storage part 220 preferably stores the image data of the plurality of interference images in association with the phase difference of the measurement light and the reference light, or an order of the interference measurement. Further, the storage part 220 may store intermediate data, a calculation result, a threshold, a parameter, and the like, which are generated (or used) by the analysis apparatus 200 in a process of the operation. Furthermore, in response to a request from each part in the analysis apparatus 200, the storage part 220 may provide the stored data to a requester.

The storage part 220 may store an Operating System (OS) for a server or the like to function as the analysis apparatus 200 and information of a program. Further, the storage part 220 may store various types of information including a database that is referred to when the program is executed. For example, the computer such as the server functions as at least a part of the acquisition part 210, the storage part 220, the removing part 230, the conversion part 240, the calculation part 250, and the output part 260 by executing the program stored in the storage part 220.

The storage part 220 includes, for example, a Read Only Memory (ROM) for storing a Basic Input Output System (BIOS) of the computer or the like, and a Random Access Memory (RAM) as a work area. Further, the storage part 220 may also include a mass storage device such as a Hard Disk Drive (HDD) and/or a Solid State Drive (SSD). Furthermore, the computer may further include a Graphics Processing Unit (GPU) or the like.

The removing part 230 outputs an interference component by removing a non-interference component included in an interference signal for each pixel in the plurality of interference images. The removing part 230 generates the interference signal for each pixel from the plurality of interference images. For example, if the interference image is image data of N×M pixels, the removing part 230 generates N×M interference signals.

Then, the removing part 230 outputs, for each interference signal, the interference component by removing the non-interference component.

The conversion part 240 performs the Hilbert transformation on the interference component outputted from the removing part 230 to generate the analysis signal. The calculation part 250 includes an instantaneous phase calculation part 252, a phase gradient calculation part 254, and a distance calculation part 256, and calculates the surface geometry of the object to be measured 10 on the basis of the interference component and the analysis signal. The calculation of the surface geometry of the object to be measured 10 by the conversion part 240 and the calculation part 250 will be described later.

The output part 260 outputs the calculation result of the surface geometry to a display device or the like. The output part 260 may display numerical data, and alternatively or additionally, may schematically display the surface geometry of the object to be measured 10. Further, the output part 260 may store the calculation result of the surface geometry of the object to be measured 10 in the external database or the like.

The analysis apparatus 200 according to the present embodiment described above generates the interference signal for each pixel from the plurality of interference images, thereby calculating the height from a reference surface of the object to be measured 10 corresponding to each pixel without an iterative calculation using a plurality of parameters. A more specific operation of the analysis apparatus 200 will be described below.

<Operation Flow of the Analysis Apparatus 200>

Figure 3:
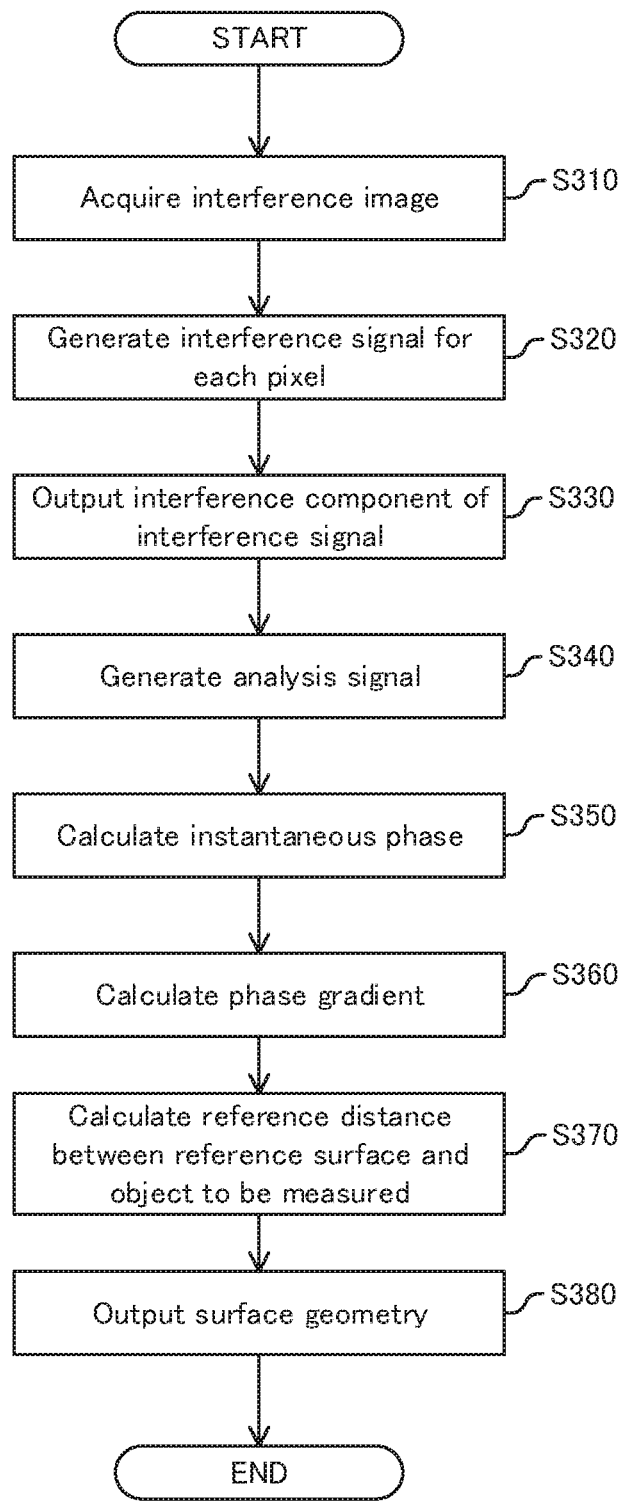
FIG. 3 shows an example of an operation flow of the analysis apparatus 200 according to the present embodiment.

FIG. 3 shows an example of an operation flow of the analysis apparatus 200 according to the present embodiment. The analysis apparatus 200 calculates and outputs the surface geometry of the object to be measured 10, in which the error based on the wavelength scanning of the light of the light source part 110 is corrected from the plurality of interference images, by executing the operations from step S310 to step S380 in FIG. 3.

First, the acquisition part 210 acquires the plurality of interference images from the interference measurement apparatus 100 (step S310). In the present embodiment, an example in which the acquisition part 210 acquires J interference images from the interference measurement apparatus 100 will be described. Here, the interference image is assumed to be image data of N×M pixels, and the image data of the interference image acquired by the acquisition part 210 is referred to as $I_i(x_n, y_m)$. Here, i=1, 2, 3, ..., J, n=1, 2, 3, ..., N, and m=1, 2, 3, ..., M.

Next, the removing part 230 generates the interference signal for each pixel from the plurality of interference images (step S320). For example, the removing part 230 generates N×M interference signals $S(i)_{n,m}$ as in the following equation. Each interference signal will contain J pieces of data.

$$S(i)_{n,m} = I_i(x_n, y_m) \quad \text{[Equation 2]}$$

Next, the removing part 230 removes the non-interference component included in the interference signal and outputs the interference component (step S330). Here, when a wave number k, which corresponds to a wavelength $\lambda_i$ outputted by the light source part 110, is defined as $k_i = 2\pi/\lambda_i$, an interference signal $S(i)_{n,m}$ is shown as in the following equation by using i) an amplitude $E_i(k)$ of the light radiated to the object to be measured 10 and ii) an amplitude reflectance r(k) of the object to be measured 10. It should be noted that $k_i$ is abbreviated to k.

$$S(k)_{n,m} = |E_i(k)|^2 \{1 + r^2(k) + 2r(k) \cos \varphi(k)_{n,m}\} \quad \text{[Equation 3]}$$

Here, $\varphi(k)_{n,m}$ is the phase difference caused by the optical path length between a position $(x_n, y_m)$ on the surface of the object to be measured 10 corresponding to the pixel $(x_n, y_m)$ and the reference surface 132. That is, in the interference signal $S(k)_{n,m}$, the term including $\varphi(k)_{n,m}$ is the interference component generated on the basis of the interference, and the other term is the non-interference component independent of the interference. By differentiating [Equation 3] by k, the interference component, in which the influence of the non-interference component is removed, can be calculated as in the following equation.

$$X(k)_{n,m} = \frac{dS(k)_{n,m}}{dk} \approx -2r|E_i(k)|^2 \sin \varphi(k)_{n,m} = A(k) \sin \varphi(k)_{n,m} \quad \text{[Equation 4]}$$

It is assumed that dr/dk<<r and $dE_i(k)/dk << E_i(k)$ are satisfied, assuming that the change amount of the wave number k is minute. Since the interference component is shown by the product of a term including the phase difference $\varphi(k)_{n,m}$ and the function A(k) as in [Equation 4], the function A(k) is an envelope function of the term including the phase difference $\varphi(k)_{n,m}$. The envelope function A(k) is desired to be substantially constant. However, as described above, since the optical properties of the light source part 110 and the object to be measured 10 have a wavelength dependency or the like, the envelope function A(k) will vary according to the wave number k.

The removing part 230 outputs such an interference component by numerically differentiating the interference signal for each pixel. It should be noted that, if the SN ratio is deteriorated due to the influence of noise or the like, the removing part 230 may perform differential processing with noise reduction processing by using an FIR differentiator or the like.

Next, the conversion part 240 generates an analysis signal $Y(k)_{n,m}$ by performing the Hilbert transformation on an interference component $X(k)_{n,m}$ of the interference signal from which the non-interference component has been removed by the removing part 230 (step S340). The Hilbert transformation is performed, for example, by convolution of the interference component X(k) and 1/πk, and the analysis signal $Y(k)_{n,m}$ is shown as in the following equation.

$$Y(k)_{n,m} = X(k)_{n,m} * \frac{1}{\pi k} = \frac{1}{\pi} \int_{-\infty}^{\infty} \frac{X(k)_{n,m}}{k - \kappa} d\kappa \quad \text{[Equation 5]}$$

Here, the Hilbert transformation H(u)(t) of the function u(t) causes a phase shift of +90° (π/2) to the negative frequency component of u(t) and −90° (−π/2) to the positive frequency component. Therefore, the analysis signal $Y(k)_{n,m}$ has substantially the same envelope function A(k) as the interference component X(k), and has a phase shifted by π/2 compared to the interference component $X(k)_{n,m}$.

Figure 4:
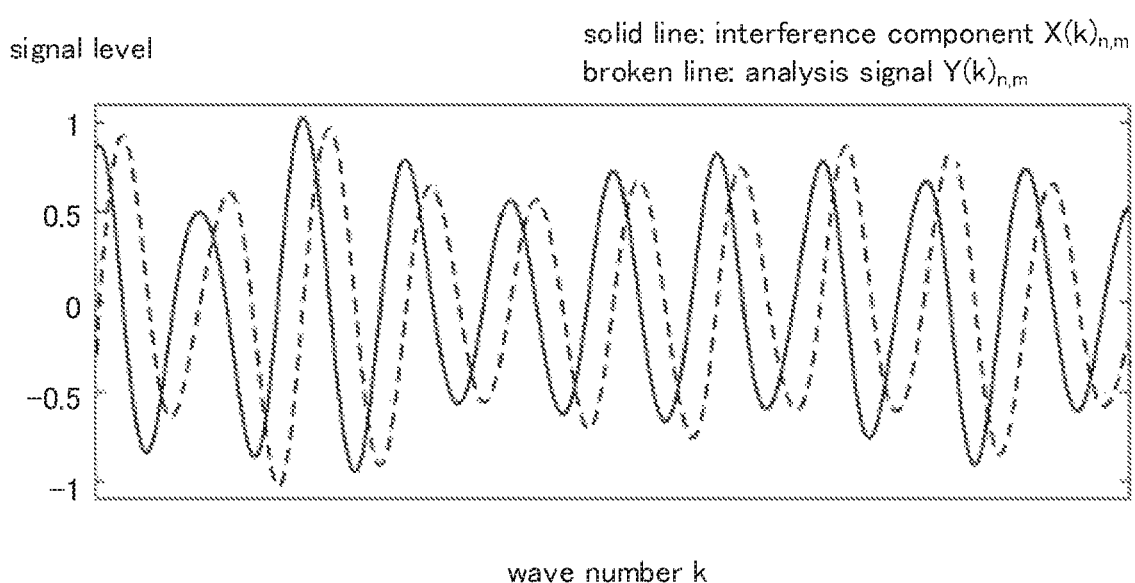
FIG. 4 shows an example of analysis signal converted by a conversion part 240 according to the present embodiment.

FIG. 4 shows an example of the analysis signal $Y(k)_{n,m}$ converted by the conversion part 240 according to the present embodiment. The horizontal axis of FIG. 4 represents the wave number k, and the vertical axis represents the signal level. It should be noted that the signal level is standardized such that the maximum value is 1 and the minimum value is −1. In FIG. 4, the signal denoted by a solid line is the interference component $X(k)_{n,m}$ of the interference signal, and the signal denoted by a broken line is the analysis signal $Y(k)_{n,m}$ after the Hilbert transformation. FIG. 4 shows, for example, that the peak value of the analysis signal $Y(k)_{n,m}$ is shifted in the horizontal axis direction by a substantially constant value compared with the interference component $X(k)_{n,m}$, and that the envelope function of the interference component $X(k)_{n,m}$ and the envelope function of the analysis signal $Y(k)_{n,m}$ are roughly the same.

Next, the instantaneous phase calculation part 252 calculates the instantaneous phase of the interference component $X(k)_{n,m}$ on the basis of the interference component $X(k)_{n,m}$ and the analysis signal $Y(k)_{n,m}$ (step S350). The instantaneous phase calculation part 252 calculates the instantaneous phase $\theta(k)_{n,m}$ as in the following equation.

$$\theta(k)_{n,m} = \operatorname{atan}\left(\frac{Y(k)_{n,m}}{X(k)_{n,m}}\right) \quad \text{[Equation 6]}$$

In the process of calculating the instantaneous phase $\theta(k)_{n,m}$ by the instantaneous phase calculation part 252, the analysis signal $Y(k)_{n,m}$ is divided by the interference component $X(k)_{n,m}$ as shown in [Equation 6]. Since the analysis signal $Y(k)_{n,m}$ and the interference component $X(k)_{n,m}$ have substantially the same envelope function A(K), the influence of the envelope function A(K) is almost eliminated by such division. Therefore, the instantaneous phase $\theta(k)_{n,m}$ calculated by the instantaneous phase calculation part 252 is a value that rarely includes the influences of the light from the light source part 110 and the fluctuation of light intensity level due to wavelength scanning of reflected light of the object to be measured 10.

Next, the phase gradient calculation part 254 calculates the phase gradient of the interference signal on the basis of the instantaneous phase $\theta(k)_{n,m}$ (step S360). The phase gradient calculation part 254, for example, connects a plurality of instantaneous phases $\theta(k)_{n,m}$ for a plurality of wave numbers k as a function of the phase $\theta(k)_{n,m}$ for the wave number k, and calculates the gradient $d\theta(k)_{n,m}/dk$ of the phase $\theta(k)_{n,m}$. Here, the phase gradient calculation part 254 is connected so that the phase $\theta(k)_{n,m}$ with respect to the wave number k changes linearly.

As an example, the phase gradient calculation part 254 calculates the phase θ(k)$_{n,m}$ with respect to the wave number k by using the least squares method. Thus, for example, in capturing an interference image by the image capturing part 140, even if random noise is mixed in the interference image, the random noise is reduced by representing the phase θ(k)$_{n,m}$ with a linear function.

Figure 5:
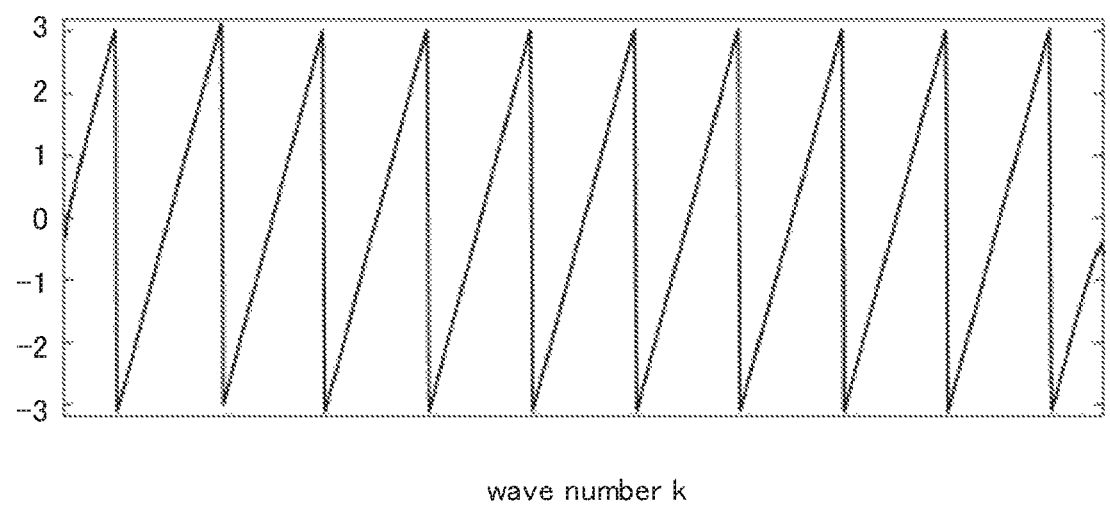
FIG. 5 shows an example of a phase with respect to a wave number calculated by a phase gradient calculation part 254 according to the present embodiment.

FIG. 5 shows an example of the phase θ(k)$_{n,m}$ with respect to the wave number k calculated by the phase gradient calculation part 254 according to the present embodiment. The horizontal axis of FIG. 5 represents the wave number k, and the vertical axis represents the phase θ. Here, the phase θ on the vertical axis has a maximum value of π and a minimum value of −π. It should be noted that the instantaneous phase θ(k)$_{n,m}$ with respect to the wave number k may change to curve without changing linearly due to wavelength dispersion of the refractive index of the optical component constituting the optical system 120 or the like.

In this case, for example, the wavelength dispersion of the refractive index of the optical component provided in the interference measurement apparatus 100 is measured and stored in the storage part 220 in advance. Then, the phase gradient calculation part 254 calculates the phase gradient dθ(k)$_{n,m}$/dk of the interference signal after calibrating the wavelength dispersion characteristic of the interference measurement apparatus 100. As described above, since the phase θ is connected such that the phase θ changes linearly with respect to the wave number k, the phase gradient dθ(k)$_{n,m}$/dk calculated by the phase gradient calculation part 254 becomes substantially constant. Therefore, the phase gradient is denoted as dθ$_{n,m}$/dk.

Next, the distance calculation part 256 calculates, for each pixel, a distance L between the reference surface 132 and the surface of the object to be measured 10 on the basis of the phase gradient dθ$_{n,m}$/dk (step S370). For the interference measurement apparatus 100 shown in FIG. 1, since the light from the light source part 110 reciprocates between the reference surface 132 and the surface of the object to be measured 10, the distance calculation part 256 calculates the distance L as in the following equation.

$$L_{n,m} = \frac{d\theta_{n,m}}{2dk} \quad \text{[Equation 7]}$$

As described above, the calculation part 250 specifies the phase gradient dθ$_{n,m}$/dk of the wavelength of the light irradiated on the reference surface 132 and the surface of the object to be measured 10 on the basis of the interference component X(k)$_{n,m}$ and the analysis signal Y(k)$_{n,m}$, and calculates the distance L$_{n,m}$ between the reference surface 132 and the surface of the object to be measured 10 for each pixel. The calculation part 250 calculates the distance L$_{n,m}$ for all the N×M pixels, thereby calculating the image data corresponding to the surface geometry of the object to be measured 10.

Next, the output part 260 outputs the calculation result of the surface geometry to a display device or the like (step S380). Thus, the analysis apparatus 200 according to the present embodiment can accurately measure the surface geometry of the object to be measured 10 by reducing the error due to the wavelength dependency of the light intensity level of the light source, the wavelength dependency of the reflectance of the object to be measurement reflecting light, the wavelength dispersion of the optical component, and the like. Since the analysis apparatus 200 can reduce such an error, even if the wavelength range of the light outputted by the light source part 110 of the interference measurement apparatus 100 is enlarged to the extent that the light intensity level of the interference light fluctuates, the interference measurement system 1000 can measure the unevenness of the object to be measured 10 with high accuracy and high resolution.

The above-described analysis apparatus 200 performs the Hilbert transformation on the interference signal and calculates the ratio between the interference signal and the signal after the Hilbert transformation, thereby reducing the influence of the fluctuation in the optical property caused by the wavelength scanning of the interference measurement apparatus 100. Thus, the analysis apparatus 200 can conveniently measure the surface geometry of the object to be measured 10 without directly measuring the unknown fluctuation of the signal level due to the wavelength scanning in the reflected light of the light source part 110 and the object to be measured 10.

It should be noted that the analysis apparatus 200 according to the present embodiment is described with an example of analyzing the interference image generated by the interference measurement apparatus 100 having a Fizeau type interferometer, but is not limited thereto. The analysis apparatus 200 can analyze the interference image even with the interference measurement apparatus 100 including other types of interferometers, as long as it is an interferometer that generates a phase shift error. For example, the interference measurement apparatus 100 may include a Twyman-Green interferometer.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured to be functionally or physically distributed and integrated in arbitrary units. Further, new exemplary embodiments generated by arbitrary combinations of them are included in the exemplary embodiments of the present invention. The effect of the new embodiment caused by the combination has the effect of the original embodiment together.

What is claimed is:

1. An interference measurement system comprising:
an analysis apparatus for analyzing an interference image; and
a wavelength-scanning-type interference measurement apparatus that generates an interference image of reference light and measurement light reflected by irradiating a reference surface and a surface of an object to be measured with lights having a plurality of different wavelengths, the reference surface being provided on an optical axis of the light having the plurality of different wavelengths, wherein
the wavelength-scanning-type interference measurement apparatus includes:
   a light source part that irradiates the surface of the object to be measured with light having the plurality of different wavelengths, and
   an image capturing part that captures the interference image of the reference light reflected at the reference surface and the measurement light reflected at the surface of the object to be measured,
the analysis apparatus includes:
   an acquisition part that acquires a plurality of the interference images based on the lights having the plurality of different wavelengths from the interference measurement apparatus;
a removing part that outputs an interference component by removing a non-interference component included in an interference signal for each pixel in the plurality of the interference images;
a conversion part that generates an analysis signal by performing a Hilbert transformation on the interference component;
a calculation part that calculates a distance between the reference surface and the surface of the object to be measured by specifying a phase gradient of a wavelength of the light radiated onto the reference surface and the surface of the object to be measured on the basis of the interference component and the analysis signal, thereby calculating surface geometry data corresponding to a surface geometry of the object to be measured, the calculation part including:
an instantaneous phase calculation part that calculates an instantaneous phase of the interference component on the basis of the interference component and the analysis signal,
a phase gradient calculation part that calculates a phase gradient of the interference signal on the basis of the instantaneous phase, and
a distance calculation part that calculates a distance between the reference surface and the surface of the object to be measured for each pixel on the basis of the phase gradient; and
an output part that outputs the surface geometry data to a display device and/or a database for displaying and/or storing the surface geometry data.

2. The interference measurement system according to claim 1, wherein
the phase gradient calculation part calculates the phase gradient of the interference signal after calibrating a wavelength dispersion property of the interference measurement apparatus.

3. The interference measurement system according to claim 1, wherein
when the interference image acquired by the acquisition part is image data $I_i(x_n, y_m)$ of N×M pixels (i=1, 2, 3, ..., J, n=1, 2, 3, ..., N, and m=1, 2, 3, ..., M), the removing part defines the interference signal for each pixel to be N×M interference signals $S(i)_{n,m}=I_i(x_n, y_m)$, assumes the interference signals $S(i)_{n,m}$ to be represented by the following equation, $$S(k_i)_{n,m}=|E_i(k_i)|^2\{1+r^2(k_i)+2r(k_i)\cos\varphi(k_i)_{n,m}\} \quad \text{[Equation 1]}$$

and calculates the interference component $X(k_i)_{n,m}$, in which an influence of a non-interference component included in the interference signal $S(i)_{n,m}$ is removed, as in the following equation, $$X(k_i)_{n,m} = \frac{dS(k_i)_{n,m}}{dk} \approx -2r|E_i(k_i)|^2 \sin\varphi(k_i)_{n,m} = A(k_i)\sin\varphi(k_i)_{n,m} \quad \text{[Equation 2]}$$

where $k_i=2\pi/\lambda_i$, $\lambda_i$ is a wavelength of measurement light and reference light, $k_i$ is a wave number, $E_i(k_i)$ is an amplitude of the light radiated onto the object to be measured, $r(k)$ is an amplitude reflectance of the object to be measured, and $\varphi(k_i)_{n,m}$ is a phase difference caused by the optical path length between a position $(x_n, y_m)$ on the surface of the object to be measured corresponding to a pixel $(x_n, y_m)$ and the reference surface.

4. The interference measurement system according to claim 3, wherein
the conversion part generates the analysis signal $Y(k)_{n,m}$ by performing the Hilbert transformation on the interference component $X(k_i)_{n,m}$, as in the following equation.

$$Y(k_i)_{n,m} = X(k_i)_{n,m} * \frac{1}{\pi k_i} = \frac{1}{\pi}\int_{-\infty}^{\infty}\frac{X(k_i)_{n,m}}{k_i - \kappa}d\kappa. \quad \text{[Equation 3]}$$

5. The interference measurement system according to claim 4, wherein
the instantaneous phase calculation part calculates the instantaneous phase $\theta(k_i)_{n,m}$ of the interference component $X(k_i)_{n,m}$ by using the interference component $X(k_i)_{n,m}$ and the analysis signal $Y(k)_{n,m}$, as in the following equation.

$$\theta(k_i)_{n,m} = \operatorname{atan}\left(\frac{Y(k_i)_{n,m}}{X(k_i)_{n,m}}\right). \quad \text{[Equation 4]}$$

6. The interference measurement system according to claim 5, wherein
the phase gradient calculation part calculates the phase gradient $d\theta(k_i)_{n,m}/dk_i \approx d\theta_{n,m}/dk$ of the interference signal, which is a constant value of the interference signal, by using the instantaneous phase $\theta(k)_{n,m}$,
the distance calculation part calculates a distance $L_{n,m}$ between the reference surface and the surface of the object to be measured for each pixel by using the phase gradient $d\theta_{n,m}/dk$, as in the following equation.

$$L_{n,m} = \frac{d\theta_{n,m}}{2dk}. \quad \text{[Equation 5]}$$

7. An analysis method for analyzing an interference image generated by a wavelength-scanning-type interference measurement apparatus that generates the interference image of reference light and measurement light reflected by irradiating a reference surface and a surface of an object to be measured with lights having a plurality of different wavelengths, the reference surface being provided on an optical axis of the light having the plurality of different wavelengths,
the interference measurement apparatus includes:
a light source part that irradiates the surface of the object to be measured with light having the plurality of different wavelengths; and
an image capturing part that captures the interference image of the reference light reflected at the reference surface and the measurement light reflected at the surface of the object to be measured,
the analysis method comprising the steps of:
acquiring a plurality of the interference images based on the lights having the plurality of different wavelengths from the interference measurement apparatus;
outputting an interference component by removing a non-interference component included in an interference signal for each pixel in the plurality of the interference images;

generating an analysis signal by performing a Hilbert transformation on the interference component;
calculating a distance between the reference surface and the surface of the object to be measured on the basis of the interference component and the analysis signal, thereby calculating surface geometry data corresponding to a surface geometry of the object to be measured, the calculating including:
  calculating an instantaneous phase of the interference component on the basis of the interference component and the analysis signal,
  calculating a phase gradient of the interference signal on the basis of the instantaneous phase, and
  calculating a distance between the reference surface and the surface of the object to be measured for each pixel on the basis of the phase gradient; and
outputting the surface geometry data to a display device and/or a database for displaying and/or storing the surface geometry data.

* * * * *